(12) United States Patent
Chang et al.

(10) Patent No.: US 8,243,185 B2
(45) Date of Patent: Aug. 14, 2012

(54) LENS, LENS MODULE AND CAMERA MODULE

(75) Inventors: Wei-Hsiu Chang, Taipei Hsien (TW); Chun-Hsiang Huang, Taipei Hsien (TW); Hsin-Tsung Yeh, Taipei Hsien (TW); Kuang-Wei Lin, Taipei Hsien (TW); Kuan-Ting Chen, Taipei Hsien (TW); Mei-Chun Lin, Miao-Li Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 661 days.

(21) Appl. No.: 12/406,074

(22) Filed: Mar. 17, 2009

(65) Prior Publication Data
US 2010/0079656 A1   Apr. 1, 2010

(30) Foreign Application Priority Data

Sep. 26, 2008 (CN) .......................... 2008 1 0304688

(51) Int. Cl.
*G03B 17/02* (2006.01)

(52) U.S. Cl. ........................................ 348/340; 396/541
(58) Field of Classification Search .................. 396/535, 396/541; 348/340; 359/819
See application file for complete search history.

(56) References Cited

U.S. PATENT DOCUMENTS

| | | | |
|---|---|---|---|
| 6,870,693 B2 * | 3/2005 | Ito | 359/819 |
| 2002/0005997 A1 * | 1/2002 | Oba | 359/819 |
| 2009/0073583 A1 * | 3/2009 | Chang | 359/819 |

* cited by examiner

*Primary Examiner* — Clayton E LaBalle
*Assistant Examiner* — Dennis Hancock
(74) *Attorney, Agent, or Firm* — Altis Law Group, Inc.

(57) ABSTRACT

A lens includes an optical portion and a mounting portion. The optical portion refracts a first portion of light from an object incident on the optical portion to form an image of the object. The mounting portion surrounds the optical portion. The mounting portion includes at least one light dispersing surface dispersing a second portion of light from the object light incident thereon. A lens module and camera module utilizing the lens are further disclosed.

4 Claims, 7 Drawing Sheets

LENS, LENS MODULE AND CAMERA MODULE

TECHNICAL FIELD

The present disclosure relates to lenses and, particularly, to a lens capable of reducing ghost or flare, and a lens module and a camera module utilizing the lens.

DESCRIPTION OF THE RELATED ART

With the development of the optical imaging technology, camera modules are becoming widely used in electronic devices, such as digital cameras and mobile phones.

A lens of a camera module often includes an optical portion located at the center thereof and a mounting portion surrounding the optical portion. The mounting portion engages a spacer or barrel of the camera module, to easily secure the lens. During image capture by the camera module, a portion of light from the object incident on the mounting portion can be reflected by the mounting portion, and reaches the image sensor of the camera module, thus forming a ghost or flare and degrading the quality of the image (as shown in FIG. 7).

What is needed, therefore, is a lens capable of reducing ghost or flare, and a lens module and camera module utilizing the lens, thereby overcoming the described shortcomings.

BRIEF DESCRIPTION OF THE DRAWING

Many aspects of the present lens, lens module and camera module can be better understood with references to the accompanying drawings. The components in the drawing are not necessarily drawn to scale, the emphasis instead being placed upon clearly illustrating the principles of the present lens, lens module and camera module.

DETAILED DESCRIPTION OF THE EMBODIMENTS

Embodiments of the present disclosure will now be described in detail below, with reference to the accompanying drawings.

Figure 1:
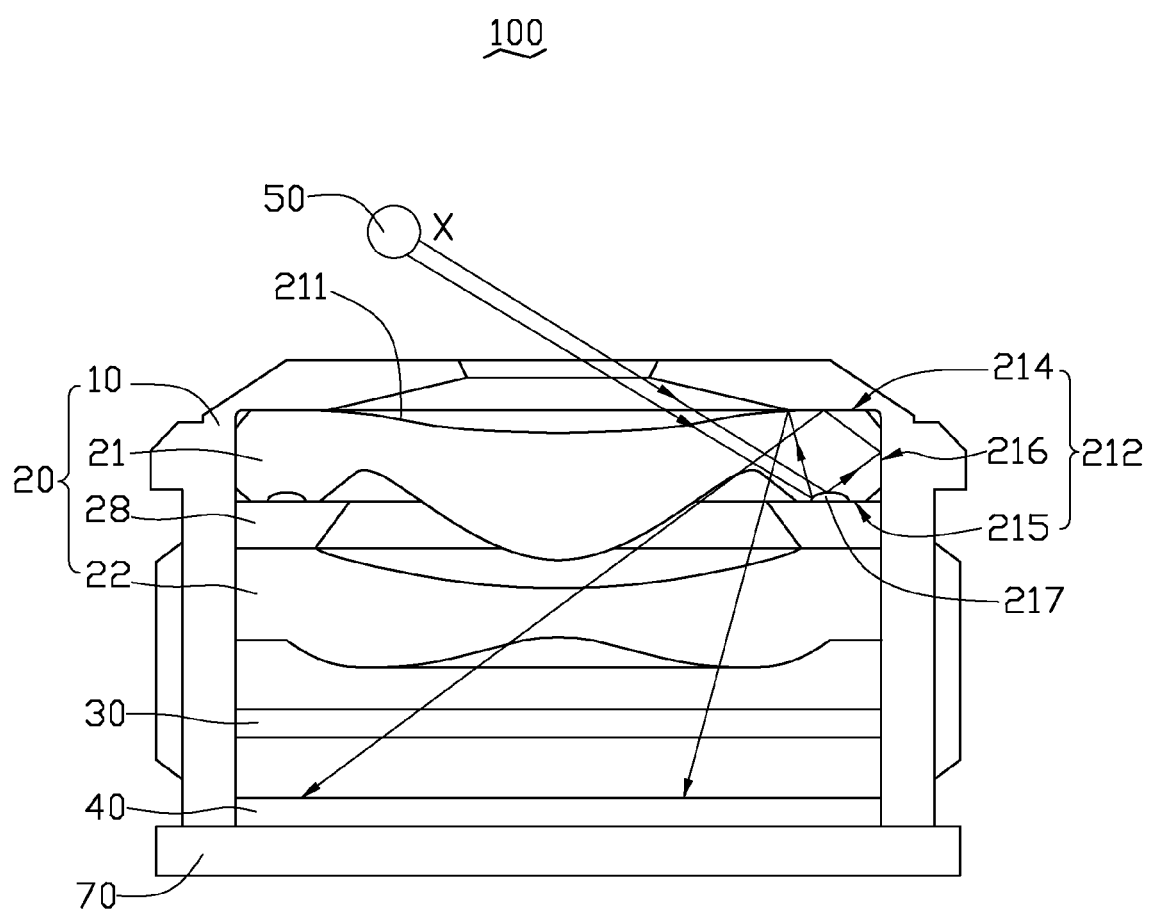
FIG. 1 is a schematic view of a camera module according to a first exemplary embodiment.

Referring to FIG. 1, a camera module 100, according to a first exemplary embodiment, is shown. The camera module 100 can have one or more lenses, as disclosed. In this embodiment, the camera module 100 includes, from the object side to the image side thereof, a lens module 20, a cover glass 30, an image sensor 40, and a circuit board 70.

The image sensor 40 is mounted on the circuit board 70 and electrically connected thereto. The cover glass 30 protects the image sensor 40 from dust, vapor and other contaminants.

The lens module 20 includes a barrel 10, a first lens 21, a second lens 22, and a spacer 28. The barrel 10 is a hollow cylinder. The first lens 21, the spacer 28, and the second lens 22 are received in the barrel 10 from the object side to the image side of the camera module 100.

The first lens 21 includes an optical portion 211 and a mounting portion 212. The optical portion 211 refracts a first portion of light (not shown) from an object 50 incident on the optical portion 211 to form an image of the object 50. The mounting portion 212 surrounds the optical portion 211. The mounting portion 212 contacts other components of the lens module 20, such as barrel 10 and/or spacer 28, to secure the first lens 21.

The mounting portion 212 includes a first surface 214 facing the object side of the camera module 100, a second surface 215 facing the image side of the camera module 100, and a side surface 216 connecting the first and second surfaces 214, 215. At least one of the first surface 214, the second surface 215, and the side surface 216 is a light dispersing surface which can disperse light incident thereon. In this embodiment, the second surface 215 is the light dispersing surface. In order that the second surface 215 can disperse the light incident thereon, the second surface 215 can be formed with at least one recess or protrusion thereon, or can be a curved surface. In this embodiment, the second surface 215 is formed with a number of recesses 217 thereon.

Figure 2:
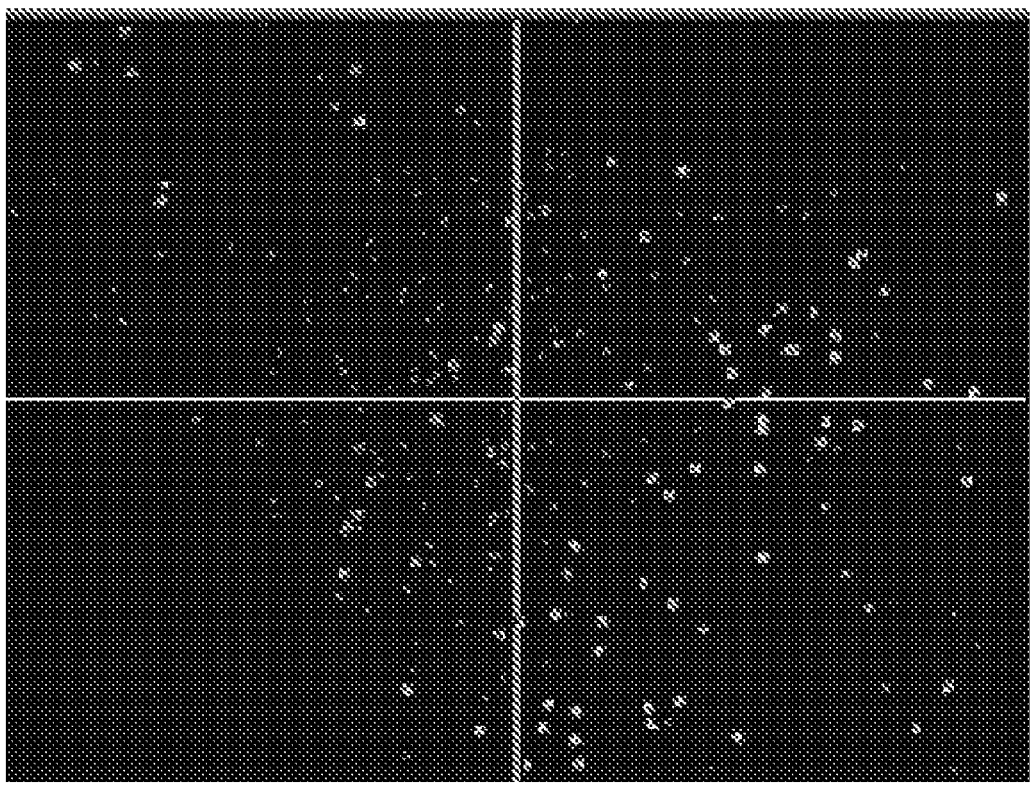
FIG. 2 is a schematic view of reflected light of the camera module of FIG. 1 incident on image sensor of the camera module.

Referring to FIG. 2, during capture of an image of the object 50 by the camera module 100, a second portion of light X from the object 50 incident on the mounting portion 212 of the first lens 21 is dispersed by the second surface 215 of the mounting portion 212, such that light X incident on the image sensor 40 is widely distributed. Accordingly, the light X cannot significantly affect the quality of the image of the object 50 captured by the camera module 101, and the quality of the image of the object 50 is maintained. It is understood that the structure of the second lens 22 can also be designed similar to the first lens 21 with at least one light dispersing surface formed thereon.

Figure 3:
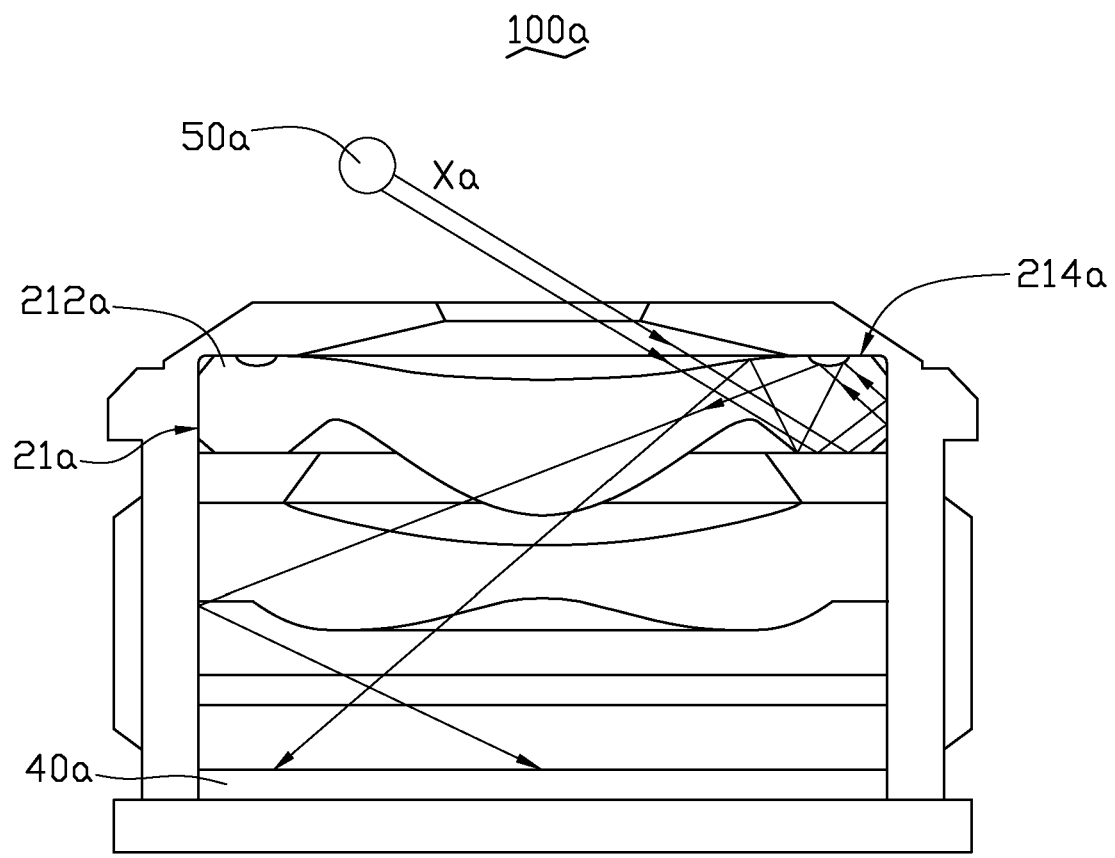
FIG. 3 is a schematic view of a camera module according to a second exemplary embodiment.

Referring to FIG. 3, a camera module 100a according to a second exemplary embodiment is shown, differing from the previous embodiment only in that that a first surface 214a of the first lens 21a facing the object side of the camera module 100a is a light dispersing surface.

Figure 4:
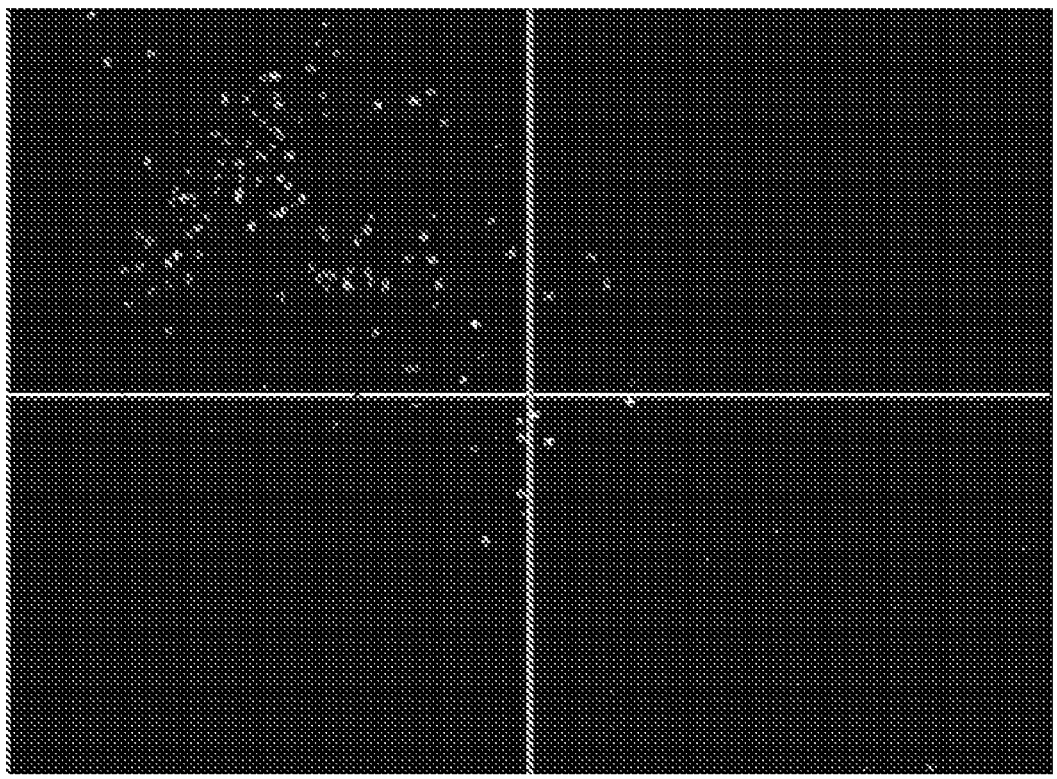
FIG. 4 is a schematic view of reflected light of the camera module of FIG. 3 reaching an image sensor of the camera module.

Referring to FIG. 4, during image capture of an object 50a by the camera module 100a, light Xa from the object 50a incident on the mounting portion 212a of the first lens 21a is dispersed by the first surface 214a of the mounting portion 212a, and is widely distributed.

Figure 5:
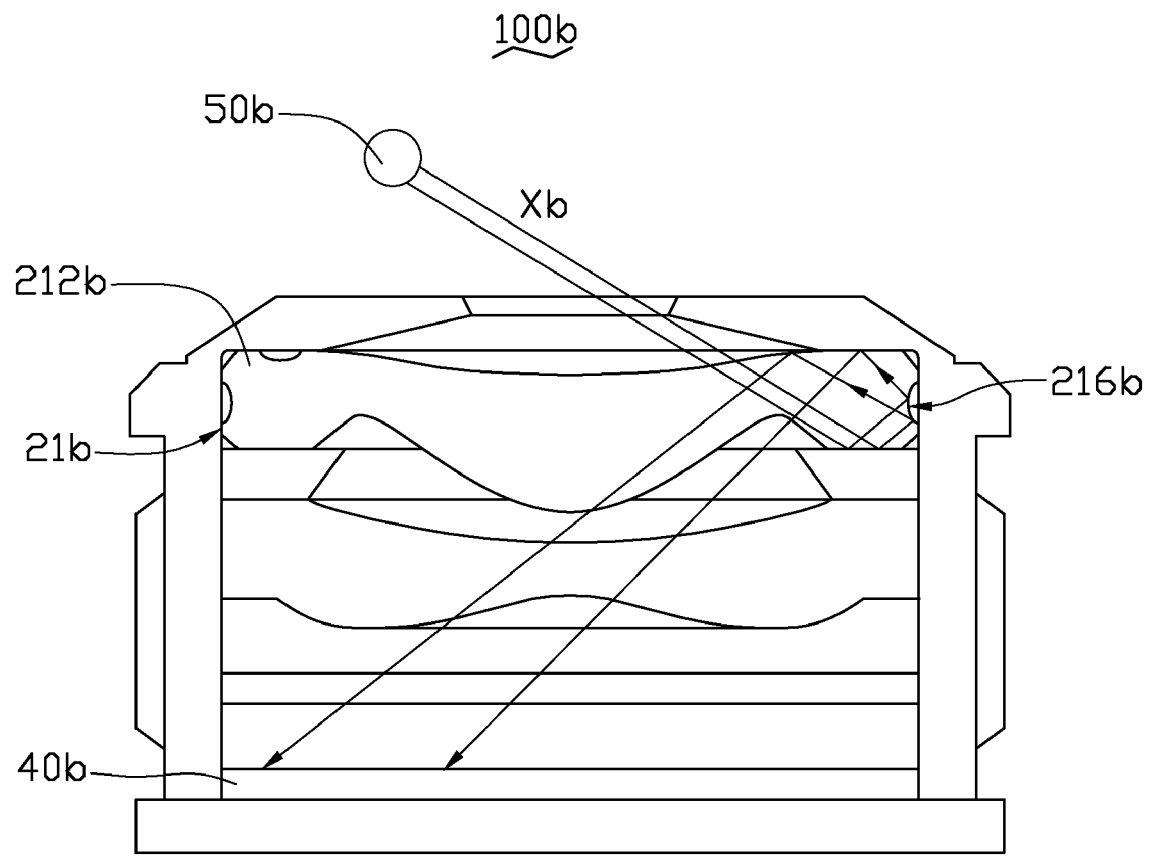
FIG. 5 is a schematic view of a camera module according to a third exemplary embodiment.

Referring to FIG. 5, a camera module 100b according to a second exemplary embodiment is shown, differing only from the first embodiment in that a side surface 216b of the first lens 21b is a light dispersing surface.

Figure 6:
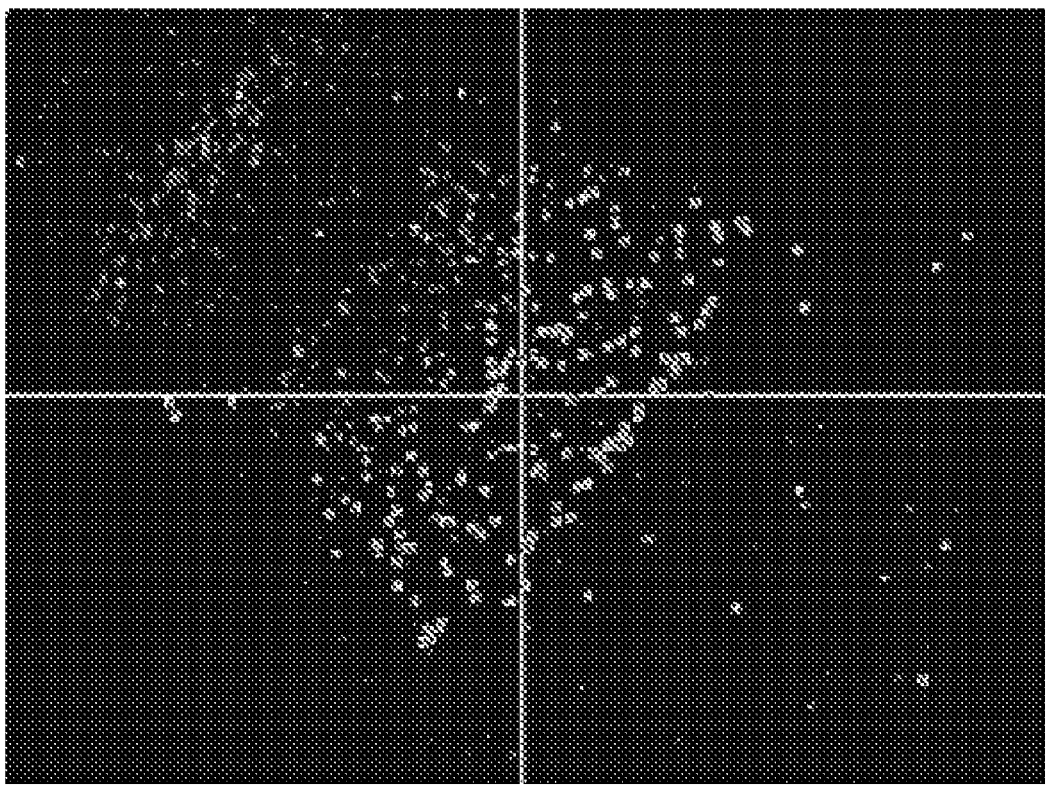
FIG. 6 is a schematic view showing stray light of the camera module of FIG. 5 incident on image sensor of the camera module.
Figure 7:
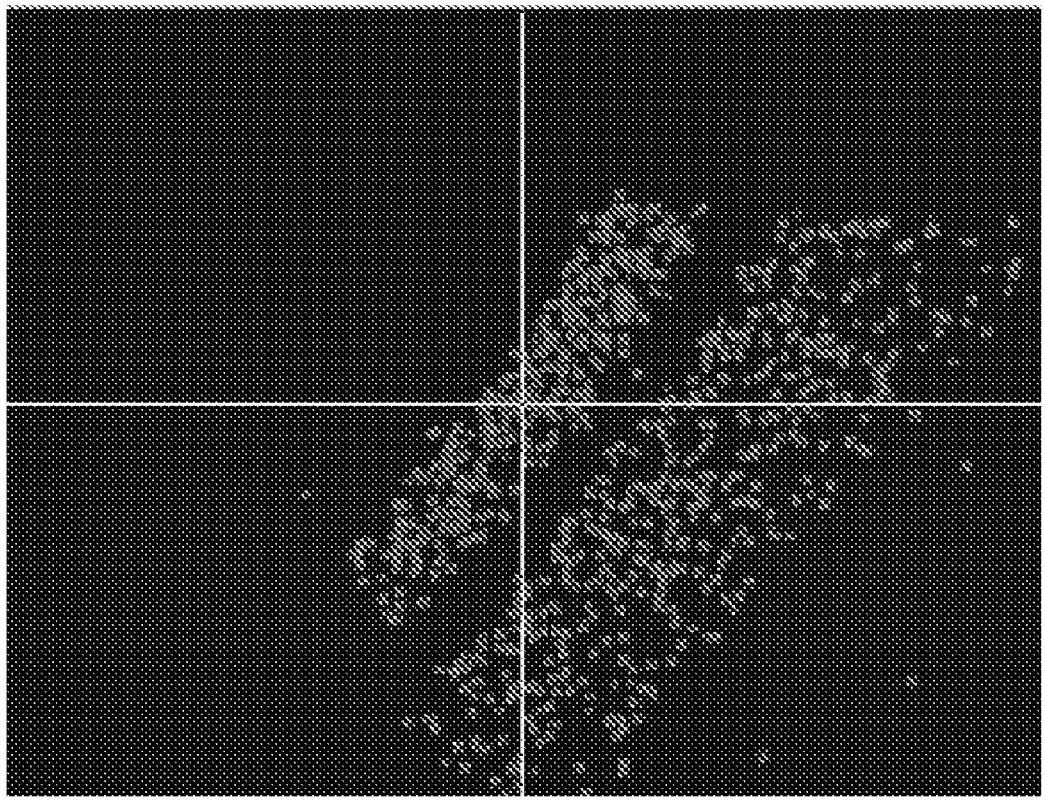
FIG. 7 is a schematic view showing stray light incident on image sensor of a camera module of a related art.

Referring to FIG. 6, during image capture of an object 50b by the camera module 100b, light Xb from the object 50b incident on the mounting portion 212b of the first lens 21b is dispersed by the side surface 216b of the mounting portion 212b, and is widely distributed.

While certain embodiments have been described and exemplified above, various other embodiments will be apparent to those skilled in the art from the foregoing disclosure. The present invention is not limited to the particular embodiments described and exemplified, and the embodiments are capable of considerable variation and modification without departure from the scope of the appended claims.

What is claimed is:

1. A lens module comprising:
a barrel; and
one or more lenses received in the barrel, at least one of which is a flare preventing lens, each flare preventing lens comprising:
an optical portion configured for refracting a first portion of light from an object incident on the optical portion to form an image of the object;
a mounting portion surrounding the optical portion, the mounting portion comprising at least one light dispersing surface configured for dispersing a second portion of the light from the object light incident thereon, wherein the mounting portion includes a first surface facing the object side, a second surface facing the image side, and a side surface connected with the first surface and the second surface, the side surface is one of the at least one light dispersing surface and is formed with at least one recess or protrusion thereon, the side surface directly touches the barrel.

2. The lens module as claimed in claim 1, wherein each of the at least one light dispersing surface is a curved surface.

3. A camera module comprising:
an image sensor; and
a lens module arranged at the object side of the image sensor, the lens module comprising:
a barrel; and
one or more lenses received in the barrel, at least one of which is a flare preventing lens, each flare preventing lens comprising:
an optical portion configured for refracting a first portion of light from an object incident on the optical portion to form an image of the object;
a mounting portion surrounding the optical portion, the mounting portion comprising at least one light dispersing surface configured for dispersing a second portion of the light from the object light incident thereon, wherein the mounting portion includes a first surface facing the object side, a second surface facing the image side, and a side surface connected with the first surface and the second surface, the side surface is one of the at least one light dispersing surface and is formed with at least one recess or protrusion thereon, the side surface directly touches the barrel.

4. The camera module as claimed in claim 3, wherein each of the at least one light dispersing surface is a curved surface.

* * * * *